(12) United States Patent
Bolotov et al.

(10) Patent No.: US 12,174,955 B2
(45) Date of Patent: Dec. 24, 2024

(54) INTEGRATED CIRCUIT SIDE-CHANNEL MITIGATION MECHANISM

(71) Applicant: Intel Corporation, Santa Clara, CA (US)

(72) Inventors: Anatoli Bolotov, San Jose, CA (US); Mikhail Grinchuk, San Jose, CA (US); Oleg Rodionov, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/354,138

(22) Filed: Jun. 22, 2021

(65) Prior Publication Data

US 2021/0312045 A1 Oct. 7, 2021

(51) Int. Cl.
*G06F 21/55* (2013.01)
*G06F 21/60* (2013.01)

(52) U.S. Cl.
CPC .......... *G06F 21/556* (2013.01); *G06F 21/602* (2013.01)

(58) Field of Classification Search
CPC .............................. G06F 21/556; G06F 21/602
See application file for complete search history.

(56) References Cited

U.S. PATENT DOCUMENTS

| 4,611,333 | A | * | 9/1986 | McCallister | ........... H04B 1/707 375/147 |
| 6,360,362 | B1 | | 3/2002 | Fichtner | |
| 7,242,776 | B1 | * | 7/2007 | Elliot | ....................... G06F 7/588 380/278 |
| 7,886,094 | B1 | | 2/2011 | Tamasi | |
| 9,871,651 | B2 | * | 1/2018 | Belenky | .................. H04L 9/003 |
| 10,491,578 | B1 | * | 11/2019 | Hebert | ....................... H04L 9/16 |
| 10,530,567 | B2 | | 1/2020 | Sugahara et al. | |
| 10,951,391 | B2 | * | 3/2021 | Avital | ..................... H04L 9/003 |
| 2005/0147246 | A1 | * | 7/2005 | Agrawal | ............... H04L 9/0662 380/44 |
| 2006/0045264 | A1 | * | 3/2006 | Kocher | ................. G06F 21/556 380/37 |
| 2009/0116644 | A1 | * | 5/2009 | Klimov | ................. H04L 9/0625 380/252 |
| 2014/0269666 | A1 | * | 9/2014 | Marsh | ................. H04L 27/2613 370/350 |
| 2015/0039890 | A1 | | 2/2015 | Khosravi | |

(Continued)

FOREIGN PATENT DOCUMENTS

| EP | 4020295 A1 | 6/2022 |
| WO | 2017222499 A1 | 12/2017 |
| WO | 20220271221 A1 | 12/2022 |

OTHER PUBLICATIONS

Extended European Search Report for European Patent Application No. 21195785.7 mailed Mar. 1, 2022, 9 pages.

(Continued)

*Primary Examiner* — Saleh Najjar
*Assistant Examiner* — Devin E Almeida
(74) *Attorney, Agent, or Firm* — Jaffery Watson Mendonsa & Hamilton LLP

(57) ABSTRACT

An apparatus to facilitate mitigation of side-channel attacks in a computer system platform is disclosed. The apparatus comprises a cryptographic circuitry, including a plurality of crypto functional units (CFUs) to perform cryptographic algorithms; and jammer circuitry to generate noise to protect the plurality of CFUs from side-channel attacks.

18 Claims, 7 Drawing Sheets

(56) References Cited

U.S. PATENT DOCUMENTS

| | | | |
|---|---|---|---|
| 2015/0052586 A1* | 2/2015 | Mills | H04L 63/0428 |
| | | | 726/4 |
| 2017/0244546 A1* | 8/2017 | Stark | H04L 9/002 |
| 2017/0270307 A1* | 9/2017 | Guilley | H04L 9/002 |
| 2018/0088625 A1 | 3/2018 | Krithivas | |
| 2018/0129476 A1* | 5/2018 | Wesson | G06F 7/582 |
| 2018/0152288 A1* | 5/2018 | Kang | H04L 9/0662 |
| 2019/0089534 A1 | 3/2019 | McWilliams et al. | |
| 2019/0103961 A1 | 4/2019 | Chhabra | |
| 2019/0318130 A1* | 10/2019 | Ghosh | H04L 9/003 |
| 2020/0137031 A1 | 4/2020 | Pappachan et al. | |
| 2020/0183876 A1 | 6/2020 | Sharma et al. | |
| 2020/0226261 A1 | 7/2020 | Dewan et al. | |
| 2021/0312044 A1 | 10/2021 | Berger et al. | |
| 2022/0300610 A1* | 9/2022 | Mendelson | G06F 9/3842 |

OTHER PUBLICATIONS

International Search Report and Written Opinion for International Application No. PCT/US2022/019797 mailed May 20, 2022, 9 pages.
Notification of Publication for Chinese Patent Application No. 202111360724.3 mailed Jun. 30, 2022, 29 pages.
Notification of TW Publication for TW Application No. 111108570 (PUB: 202301157), mailed Jan. 5, 2023, 2 pages.
Office Action from U.S. Appl. No. 17/354,125, mailed Mar. 22, 2023, 14 pages.
Office Action for U.S. Appl. No. 18/339,571 mailed Feb. 1, 2024, 13 pages.

* cited by examiner

INTEGRATED CIRCUIT SIDE-CHANNEL MITIGATION MECHANISM

BACKGROUND OF THE DESCRIPTION

A system on chip (SOC) is an integrated circuit that integrates all components of a computer or other electronic system. These components include a central processing unit (CPU), memory, input/output (IO) ports and secondary storage, which are all included on a single substrate or microchip. Recently, the quantity of hardware attacks (e.g., both invasive and non-invasive, passive and active) on SOCs has been growing, especially on storage systems storing large quantities of sensitive data remotely and outside of a processor's trusted zone (e.g., in client-side memory, cloud storage, server side. etc.).

BRIEF DESCRIPTION OF THE DRAWINGS

So that the manner in which the above recited features of the present embodiment can be understood in detail, a more particular description of the embodiment, briefly summarized above, may be had by reference to embodiments, some of which are illustrated in the appended drawings. It is to be noted, however, that the appended drawings illustrate only typical embodiments of this embodiment and are therefore not to be considered limiting of its scope, for the embodiment may admit to other equally effective embodiments.

DETAILED DESCRIPTION

In the following description, numerous specific details are set forth to provide a more thorough understanding of the present embodiment. However, it will be apparent to one of skill in the art that the present embodiment may be practiced without one or more of these specific details. In other instances, well-known features have not been described in order to avoid obscuring the present embodiment.

In embodiments, a mechanism is provided to facilitate the mitigation of side-channel attacks in computing platforms. In such embodiments, jammer circuitry is provided to generate noise to prevent side channel attacks of cryptographic engines processing sensitive data.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to and are not intended to imply that the elements so described must be in a given sequence, either temporally, spatially, in ranking, or in any other manner.

Figure 1:
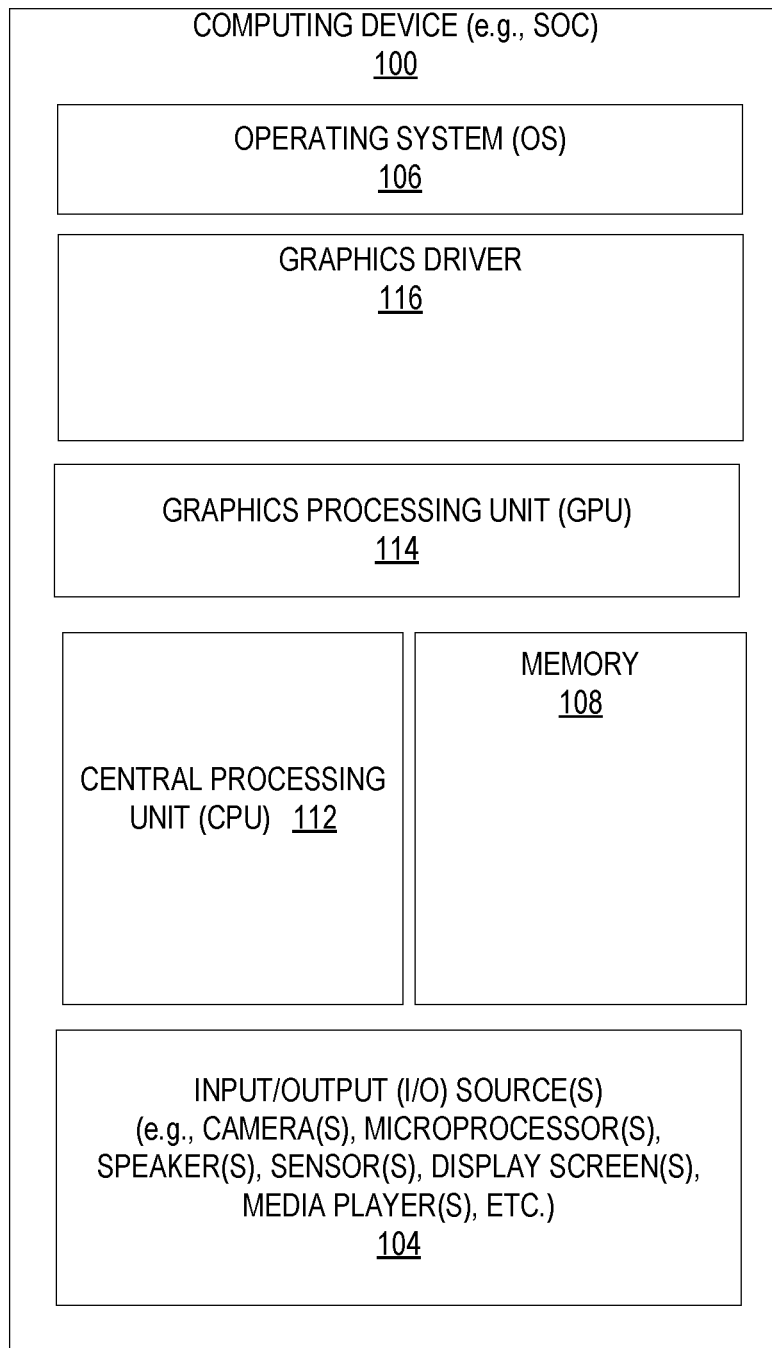
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
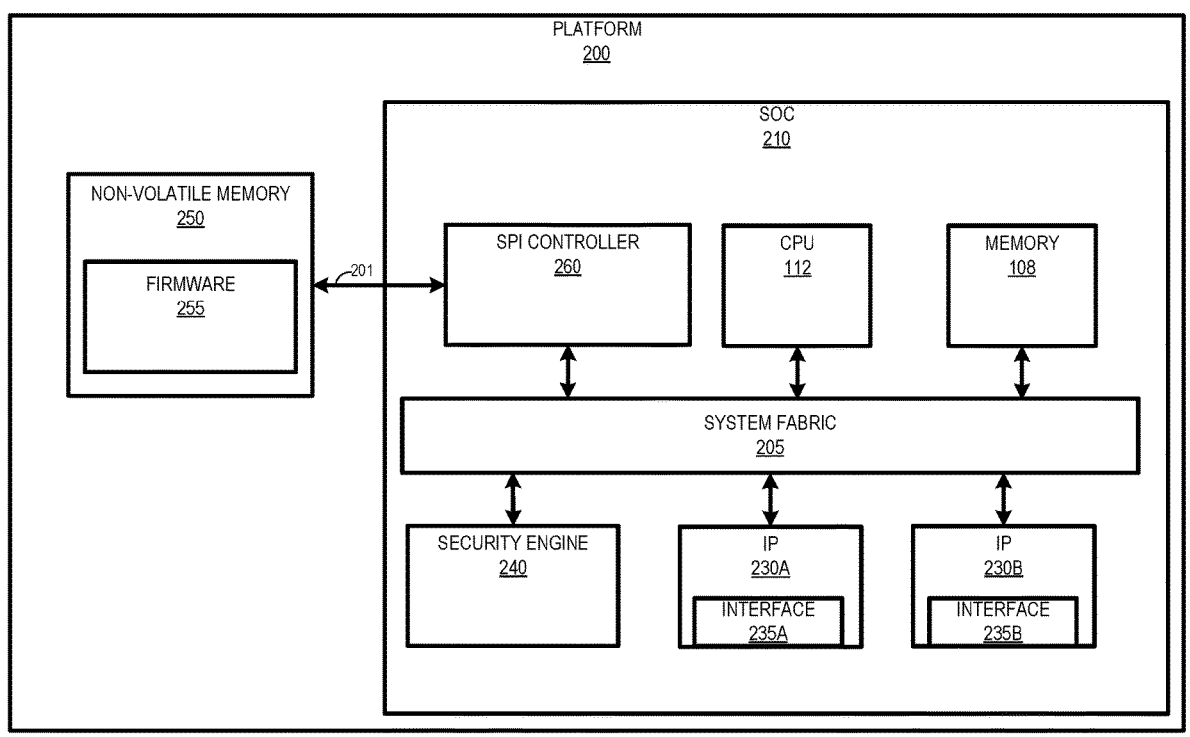
FIG. 2 illustrates one embodiment of a platform.

FIG. 2 illustrates one embodiment of a platform 200 including a SOC 210 similar to computing device 100 discussed above. As shown in FIG. 2, SOC 210 includes other computing device components (e.g., memory 108 and CPU 112) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP agents 230A and 230B) within SOC 210. In such an embodiment, the interconnect protocol provides a standardized interface to enable third parties to design logic such as IP agents to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 (e.g., 235A and 235B) to provide standardization to enable the IP agent 230 to communicate with SOC 210 components. For example, in an embodiment in which IP agent 230 is a third-party visual processing unit (VPU), interface 235 provides a standardization to enable the VPU to access memory 108 via fabric 205.

Further, SOC 210 is coupled to a non-volatile memory 250. Non-volatile memory 250 may be implemented as a Peripheral Component Interconnect Express (PCIe) storage drive, such as a solid-state drive (SSD) or Non-Volatile Memory Express (NVMe) drives. In one embodiment, non-volatile memory 250 is implemented to store the platform 200 firmware 255. In one embodiment, SOC 210 is coupled to non-volatile memory 250 via a serial peripheral interface (SPI) 201. In such an embodiment, SOC 210 includes SPI controller 260 coupled between SPI 201 and system fabric 205. In a further embodiment, SPI controller 260 is a flash controller implemented to control access to non-volatile memory 250 via SPI 201.

Figure 3:
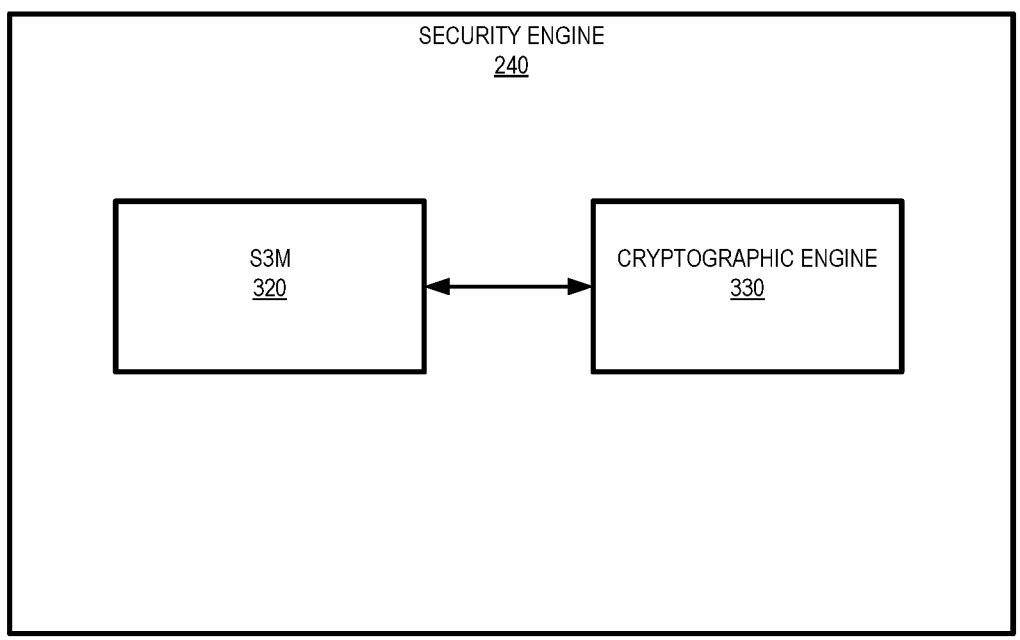
FIG. 3 illustrates one embodiment of a security engine.

SOC 210 also includes a security engine 240 that performs various security operations (e.g., security processing, cryptographic functions, etc.) for SOC 210. In one embodiment, security engine 240 comprises an IP agent 230 that is implemented to perform the security operations. FIG. 3 illustrates one embodiment of security engine 240. As shown in FIG. 3, security engine 240 comprises a secure startup services module (S3M) 320 and cryptographic engine 330.

S3M 320 is a secure micro-controller implemented to perform security services and secure boot support for platform 200. Cryptographic engine 330 is coupled to S3M 320 and includes a plurality of crypto functional units (CFUs) that are implemented to perform various cryptographic algorithms (or functions) supported by security engine 240. As discussed above, platforms are becoming more exposed to hardware attacks, such as side-channel attacks. Specifically, side-channel attacks may be used to reveal secret data (usually cryptographic keys) generated at cryptographic engine 330 by analyzing a crypto algorithm implementation and exploiting information leakage through a statistical measurement of various physical parameters (e.g., latency and timing, or power consumption and electromagnetic radiation emitted) during secret data operations.

For example, detection of a noisy signal is part of several side channel attacks, in particular power analysis or electromagnetic (EM) radiation analysis. For a single observation, a detection is possible if signal to noise ratio (S/N or SNR) is higher than a certain threshold. For signals that are too noisy, attackers may apply signal averaging over T samples. This improves SNR but makes attack T times longer. Typically (in assumption that the signal is repeated with no changes, but the noise for each new sample is generated independently) this increases SNR (after averaging) about T times, e.g., the required attack's time (or time to reach the detection threshold) is inversely proportional to original SNR, such that:

$$T \sim \frac{N}{S}.$$

According to one embodiment, jamming circuitry (or jammer) is included within cryptographic engine 330 to generate noise as a counter measure to mask sources of information attributed to vulnerable cryptographic algorithms. In such an embodiment, the jammer is configurable to mask signals generated by the processing of secure data by generating noise that decreases signal-to-noise ratio. The signal-to-noise ratio is decreased by adding to randomly generated noise of a cryptographic algorithm, which makes it difficult for an intruder to derive information associated with sensitive data generated by a CFU.

Figure 4:
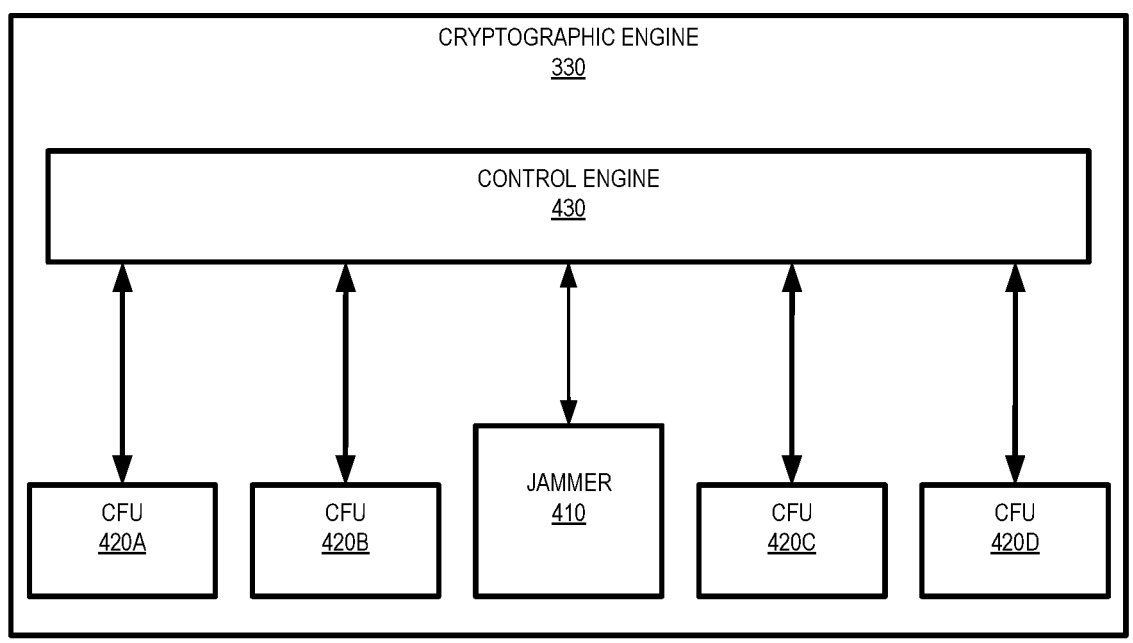
FIG. 4 illustrates one embodiment of cryptographic engine.

FIG. 4 illustrates one embodiment of cryptographic engine 330 including a jammer 410. Cryptographic engine 330 also includes CFUs 420 (e.g., CFU 420A-420D) and a control engine 430. As discussed above, CFUs 420 perform various cryptographic functions. For example, CFUs 420 may include advanced encryption standard (AES), hash-based message authentication code (HMAC), Rivest-Shamir-Adleman (RSA), Elliptic-curve cryptography (ECC) functional units. However, other embodiments may include different CFUs that implement different algorithms. Control engine 430 includes control logic, data buffers and switching circuitry implemented to switch operation between the CFUs 420. Additionally, control engine 430 receives control signals to enable/disable jammer 410.

According to one embodiment, jammer 410 operate as a noise generator to protect each CFU 420 within cryptographic engine 330 without modification to any CFU 420. In a further embodiment, jammer 410 may be configured to augment protection provided for a CFU 420. In such an embodiment, jammer 410, during configuration, may be provided with signal properties (e.g., power, radiation, patterns etc.) for a CFU 420 to generate noise during operation of the CFU 420 based on the signal properties.

Figure 5:
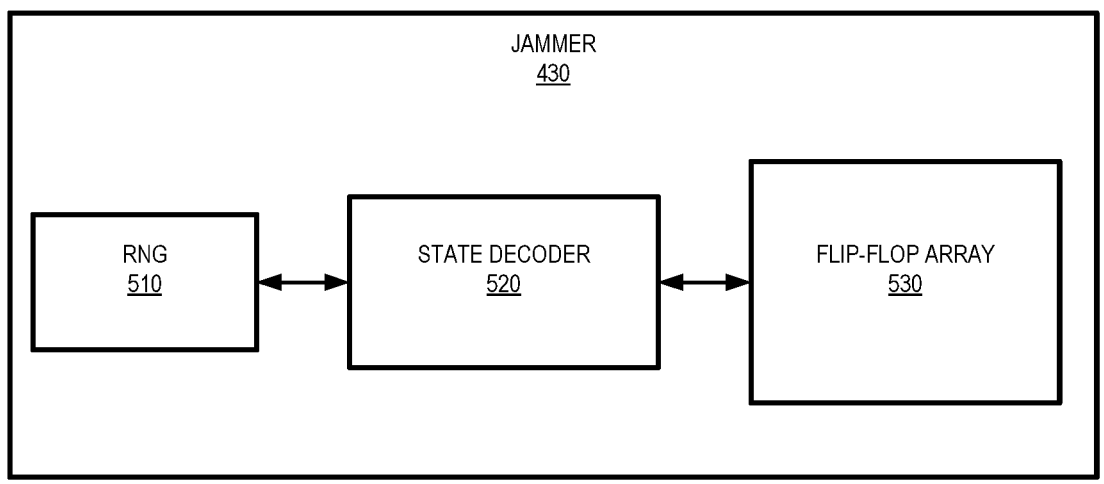
FIG. 5 illustrates one embodiment of jammer.

FIG. 5 illustrates one embodiment of jammer 410. As shown in FIG. 5, jammer 410 includes a random number generator (RNG) 510, a state decoder 520 and a flip-flop array 530. RNG 510 generates variable size values that are varied based on the amount of noise that is to be created. Thus, jammer 410 generates a variable quantity of noise during operation to prevent side-channel attackers from detecting a particular noise pattern.

In one embodiment, RNG 510 generates two integer values (x and y) of a range of 0—B−1, where B represents a number of flip-flops in flip-flop array 530. State decoder 520 converts the integer values into a bit vector (V) having a variable bit length, and a maximum length of B. In one embodiment, the vector bit value (V[i]) is determined based on the random values x and y, such that:

$V[i]=(x \leq i$ and $i<y)$ if $(x<y)$;

else $V[i]=(x \leq i$ or $i<y)$, where i is a coordinate of bit vector V=(V[1],
V[2], . . . , V[i], . . . , V[B]) so that, $1<=i<=B$.
Subsequently, the state of flip-flop array 530 is set as the vector (V). The number of flip-flop gated outputs, as well as the number of flip-flop switches (e.g., 1 to 0 or 0 to 1) are a collective of B noise emitters, which operate as a single noise emitter with VB times larger amplitude and with B times larger power of output signal. In one embodiment, the above process occurs during each clock cycle. However other embodiments may implement different intervals for jammer operation.

Based on the above-design, approximately half of the flip-flops (B/2) in flip-flop array 530 have state 0 (and state 1) at each clock cycle. Also, approximately one-fourth of the flip-flops (B/4) are switching from 0 to 1 (and from 1 to 0), while B/4 are maintaining state 0 (and state 1). In one embodiment, the above calculation has an order of B variation, such that variations are approximately 0.29 B for the number of flip-flops in a given state and approximately 0.23 B for the number of flip-flops performing a given transition. Thus, for a collection of R independent randomly controlled flip-flops, such variations are $0.5\sqrt{R}$ and $0.43\sqrt{R}$ respectively. To match the noise produced by such a collection, jammer 410 implements less than $2\sqrt{R}$ flip-flops (in particular, 10K→200, 1M→2K, 100M→20K).

Although discussed with reference to the embodiment shown in FIG. 5, jammer 410 may be implemented according to different embodiments. For example, jammer 410 may be implemented using a copy of each CFU 420. In such an embodiment, the jammer 410 would operate during operation of the original CFU 420 but use random inputs. Thus, the noise generated by jammer 410 would mask the signal.

Figure 6:
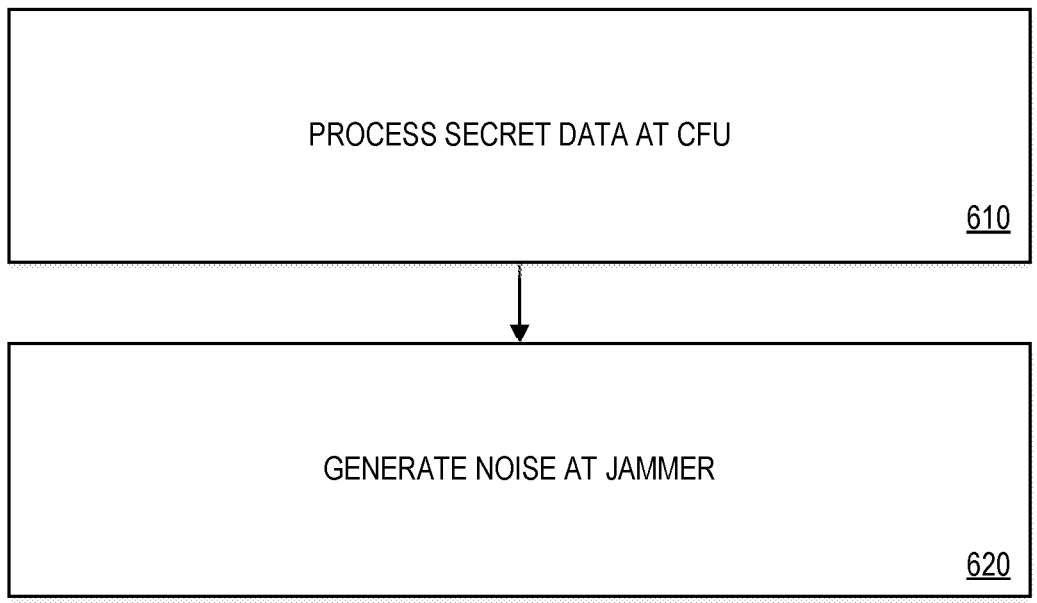
FIG. 6 is a flow diagram illustrating one embodiment of a process performed by a jammer.

FIG. 6 is a flow diagram illustrating one embodiment of a process performed by a jammer. At processing block 610, secure data is processed at a CFU 420 via a cryptographic algorithm. At processing block 620, noise is generated at jammer 410 to mask the secure data processed at the CFU 420. As discussed above, random noise is generated by converting a randomly generated number to a bit vector that is stored in an array of flip-flops. The noise generated by the output of flip-flop gates, as well as the transitioning of the gate states, results in a noise emitter that masks signals generated by the processing of the secure data.

Figure 7:
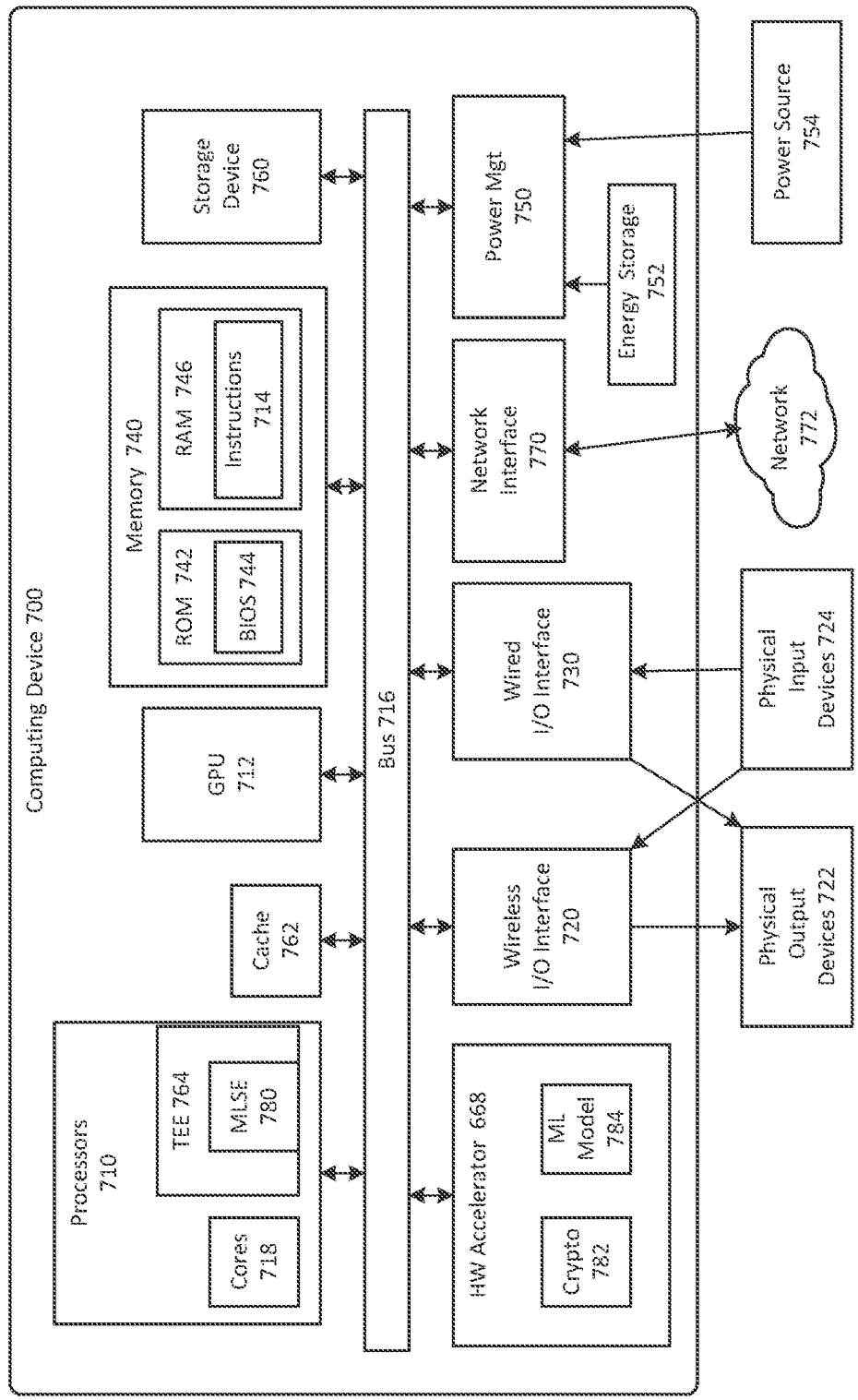
FIG. 7 illustrates one embodiment of a schematic diagram of an illustrative electronic computing device.

FIG. 7 is a schematic diagram of an illustrative electronic computing device to enable enhanced protection against adversarial attacks according to some embodiments. In some embodiments, the computing device 700 includes one or more processors 710 including one or more processors cores 718 and a TEE 764, the TEE including a machine learning service enclave (MLSE) 780. In some embodiments, the computing device 700 includes a hardware accelerator 768, the hardware accelerator including a cryptographic engine 782 and a machine learning model 784. In some embodiments, the computing device is to provide enhanced protections against ML adversarial attacks, as provided in FIGS. 1-6.

The computing device 700 may additionally include one or more of the following: cache 762, a graphical processing unit (GPU) 712 (which may be the hardware accelerator in some implementations), a wireless input/output (I/O) interface 720, a wired I/O interface 730, memory circuitry 740, power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random-access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include but are not limited to: universal serial bus (USB), IEEE 1394 ("Fire-Wire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus to facilitate mitigation of side-channel attacks in a computer system platform, comprising a cryptographic circuitry, including a plurality of crypto functional units (CFUs) to perform cryptographic algorithms; and jammer circuitry to generate noise to protect the plurality of CFUs from side-channel attacks.

Example 2 includes the subject matter of Example 1, wherein the jammer circuitry masks signals generated by the processing of secure data by the cryptographic algorithms.

Example 3 includes the subject matter of Examples 1 and 2, wherein the jammer circuitry masks the signals by decreasing a signal-to-noise ratio of signals by adding noise generated at a CFU.

Example 4 includes the subject matter of Examples 1-3, wherein each of the plurality of CFUs perform a different cryptographic algorithm.

Example 5 includes the subject matter of Examples 1-4, wherein the jammer circuitry comprises a random number generator to generate integer values.

Example 6 includes the subject matter of Examples 1-5, wherein the jammer circuitry further comprises a state decoder to convert the integer values in a bit vector.

Example 7 includes the subject matter of Examples 1-6, wherein a value of the bit vector is determined by a first of the integer values and a second of the integer values.

Example 8 includes the subject matter of Examples 1-7, wherein the jammer circuitry further comprises a flip-flop array comprising a plurality of flip-flops to store the bit vector.

Example 9 includes the subject matter of Examples 1-8, wherein gated outputs states and a switching of the states of the plurality of flip-flops generates the noise.

Example 10 includes the subject matter of Examples 1-9, wherein the cryptographic circuitry further comprises control circuitry to receive control signals to enable and disable the jammer circuitry.

Some embodiments pertain to Example 11 that includes a method to facilitate mitigation of side-channel attacks in a computer system platform, comprising processing data at a crypto functional unit (CFU) via a cryptographic algorithm and generating noise at jammer circuitry to mask the data processed at the CFU, wherein the jammer circuitry masks signals generating during processing of the cryptographic algorithm by adding noise generated at the CFU to decrease a signal-to-noise ratio of signals.

Example 12 includes the subject matter of Example 11, wherein generating the noise comprises generating integer values at a random number generator; and converting the integer values into a bit vector.

Example 13 includes the subject matter of Examples 11 and 12, wherein a value of the bit vector is determined by a first of the integer value and a second of the integer value.

Example 14 includes the subject matter of Examples 11-13, wherein generating the noise further comprises storing the bit vector in a plurality of flip-flops within a flip-flop array.

Some embodiments pertain to Example 15 that includes a security engine comprising a micro-controller to perform security services a computer system platform; and a cryptographic circuitry, communicatively couple to the micro-controller, including a plurality of crypto functional units (CFUs) to perform cryptographic algorithms and jammer circuitry to generate noise to protect the plurality of CFUs from side-channel attacks.

Example 16 includes the subject matter of Example 15, wherein the jammer circuitry comprises a random number generator to generate integer values and a state decoder to convert the integer values in a bit vector.

Example 17 includes the subject matter of Examples 15 and 16, wherein a value of the bit vector is determined by a first of the integer values and a second of the integer values.

Example 18 includes the subject matter of Examples 15-17, wherein the jammer circuitry further comprises a flip-flop array comprising a plurality of flip-flops to store the bit vector.

Example 19 includes the subject matter of Examples 15-18, wherein gated outputs states and a switching of the states of the plurality of flip-flops generates the noise.

Example 20 includes the subject matter of Examples 15-19, wherein the cryptographic circuitry further comprises control circuitry to receive control signals from the micro-controller to enable and disable the jammer circuitry.

The embodiment has been described above with reference to specific embodiments. Persons skilled in the art, however, will understand that various modifications and changes may be made thereto without departing from the broader spirit and scope of the embodiment as set forth in the appended claims. The foregoing description and drawings are, accordingly, to be regarded in an illustrative rather than a restrictive sense.

What is claimed is:

1. An apparatus comprising:
a cryptographic circuitry, including:
a plurality of crypto functional units (CFUs) to perform cryptographic algorithms; and
jammer circuitry to generate noise to protect the plurality of CFUs from side-channel attacks, including:
a flip-flop array including a plurality of flip-flops to switch states to generate the noise; and
a random number generator to generate a first integer value having a first bit length for a first quantity of the noise to be generated by the flip-flop array and a second integer value having a second bit length for a second quantity of the noise to be generated by the flip-flop array.

2. The apparatus of claim 1, wherein the jammer circuitry masks signals generated by processing of secure data by the cryptographic algorithms.

3. The apparatus of claim 2, wherein the jammer circuitry masks the signals by decreasing a signal-to-noise ratio of the signals by adding the noise generated at a CFU.

4. The apparatus of claim 3, wherein each of the plurality of CFUs perform a different cryptographic algorithm.

5. The apparatus of claim 1, wherein the jammer circuitry further comprises a state decoder to receive the integer values from the random number generator and convert the integer values into a bit vector.

6. The apparatus of claim 5, wherein a value of the bit vector is determined by the first integer value and the second integer value.

7. The apparatus of claim 6, wherein the plurality of flip-flops store the bit vector.

8. The apparatus of claim 7, wherein gated output states and the switching of the states of the plurality of flip-flops generates the noise.

9. The apparatus of claim 2, wherein the cryptographic circuitry further comprises control circuitry to receive control signals to enable and disable the jammer circuitry.

10. A method comprising:
processing data at a crypto functional unit (CFU) via a cryptographic algorithm; and
generating noise at jammer circuitry to mask the data processed at the CFU, including:
receiving a first integer value having a first bit length;
generating a first quantity of the noise at a flip-flop array based on the first integer value;
receiving a second integer value; and
generating a second quantity of the noise at the flip-flop array based on the second integer value.

11. The method of claim 10, further comprising:
converting the first integer value into a first bit vector; and
converting the second integer value into a second bit vector.

12. The method of claim 11, wherein generating the noise masks processing of secure data by the cryptographic algorithms.

13. A security engine comprising:
a micro-controller to perform security services a computer system platform; and
a cryptographic circuitry, communicatively couple to the micro-controller, including:
a plurality of crypto functional units (CFUs) to perform cryptographic algorithms; and
jammer circuitry to generate noise to protect the plurality of CFUs from side-channel attacks, including:
a flip-flop array including a plurality of flip-flops to switch states to generate the noise; and
a random number generator to generate a first integer value having a first bit length for a first quantity of the noise to be generated by the flip-flop array and a second integer value having a second bit length for a second quantity of the noise to be generated by the flip-flop array.

14. The security engine of claim 13, wherein the jammer circuitry comprises:
a state decoder to receive the integer values from the random number generator and convert the integer values in a bit vector.

15. The security engine of claim 14, wherein a value of the bit vector is determined by the first integer value and the second integer value.

16. The security engine of claim 15, wherein the plurality of flip-flops store the bit vector.

17. The security engine of claim 16, wherein gated output states and the switching of the states of the plurality of flip-flops generates the noise.

18. The security engine of claim 13, wherein the cryptographic circuitry further comprises control circuitry to receive control signals from the micro-controller to enable and disable the jammer circuitry.

\* \* \* \* \*